United States Patent
Mitsuishi et al.

(10) Patent No.: US 6,919,134 B2
(45) Date of Patent: Jul. 19, 2005

(54) OPTICAL ELEMENT HAVING ANTIREFLECTION FILM

(75) Inventors: Takeshi Mitsuishi, Tokyo (JP); Hiroshi Shirakawa, Tokyo (JP); Kenichi Shinde, Tokyo (JP)

(73) Assignee: HOYA Corporation, Tokyo (JP)

( * ) Notice: Subject to any disclaimer, the term of this patent is extended or adjusted under 35 U.S.C. 154(b) by 0 days.

(21) Appl. No.: 10/279,931

(22) Filed: Oct. 25, 2002

(65) Prior Publication Data

US 2004/0151918 A9 Aug. 5, 2004

(30) Foreign Application Priority Data

Oct. 25, 2001 (JP) ..................................... 2001-327252

(51) Int. Cl.⁷ ................................................ B32B 9/04
(52) U.S. Cl. .................... 428/447; 428/448; 428/45; 359/580; 359/581; 359/582; 427/164; 427/255.6
(58) Field of Search ................................ 428/447, 448, 428/451, 327, 329, 331; 359/580, 581, 582; 427/164

(56) References Cited

U.S. PATENT DOCUMENTS 5,104,692 A * 4/1992 Belmares .................... 427/164
5,181,141 A 1/1993 Sato et al.

FOREIGN PATENT DOCUMENTS

| JP | 63-141001 | 6/1988 |
| JP | 09-127303 | 5/1997 |
| JP | 11-130982 | * 5/1999 |

OTHER PUBLICATIONS

Machine Translation, JP 11–130982, Miyashita et al., May 1999.*

* cited by examiner

*Primary Examiner*—Randy Gulakowski
*Assistant Examiner*—Christopher Keehan
(74) *Attorney, Agent, or Firm*—Finnegan, Henderson, Farabow, Garrett & Dunner, LLP

(57) ABSTRACT

The present invention is directed to an optical element having an antireflection film formed on a plastic substrate, wherein the reflectance of the antireflection film is low while the transmittance thereof is high. The impact resistance, the adhesiveness, the heat resistance, the abrasion resistance and the alkali resistance of the antireflection film on the plastic substrate are superior.

The optical element having an antireflection film has at least one layer of the antireflection film that is a hybrid layer made of an inorganic substance and an organic substance.

39 Claims, No Drawings

OPTICAL ELEMENT HAVING ANTIREFLECTION FILM

CROSS-REFERENCE TO RELATED APPLICATION

The present application claims priority under 35 U.S.C. § 119 of Japanese Application No. 2001-327252, filed Oct. 25, 2001, the disclosure of which is expressly incorporated by reference herein in its entirety.

DESCRIPTION OF THE INVENTION

1. Field of the Invention

The present invention relates to optical elements having an antireflection film, and to those having an antireflection film formed on a plastic substrate. The luminous reflectance of the antireflection film is low while the luminous transmittance thereof is high. The impact resistance, the adhesiveness, the heat resistance, the abrasion resistance and the alkali resistance on the plastic substrate are superior in optical elements of the invention, and the productivity is good.

2. Background of the Invention

Heretofore known are optical elements comprising a plastic substrate and an antireflection film formed thereon through vapor deposition of inorganic substances. Such optical elements have superior properties in terms of their antireflection properties and scratch resistance.

However, such optical elements having an antireflection film are unsatisfactory with respect to their impact resistance and the heat resistance. To solve the problem, for example, it is known to provide a primer layer made of an organic compound between the plastic substrate and the antireflection film, as in Japanese Patent Laid-Open No. 141001/1988.

However, the primer layer is formed by applying a primer solution onto a plastic substrate, followed by heating and curing it, and thereafter, an antireflection film is formed through vapor deposition. Therefore, one problem with it is that the primer layer is often uneven in terms of the film thickness. Regarding the primer disclosed in the above-cited patent publication, the primer layer is formed in air while the antireflection film is formed in vacuum. Therefore, other problems with it are that foreign matter may likely enter the interface between the antireflection film and the primer layer and that it takes a lot of time to fabricate the final product.

SUMMARY OF THE INVENTION

The present inventors have found that when at least one constitutive layer of the antireflection film is a hybrid layer comprising an inorganic substance and an organic substance, an optical element having an antireflection film, which has superior impact resistance, adhesiveness, heat resistance and abrasion resistance and, in addition, improved productivity, is obtained.

Specifically, the optical element having an antireflection film of the invention is an optical element having an antireflection film, which comprises a plastic substrate and an antireflection film that may be formed thereon through vacuum evaporation. At least one layer of the antireflection film is a hybrid layer comprising an inorganic substance and an organic substance. Having the hybrid layer therein, the optical element having an antireflection film, which has superior adhesiveness, heat resistance and abrasion resistance, can be provided without impairing impact resistance, even when a primer layer such as that described in Japanese Patent Laid-Open No. 141001/1988 is not provided. Like the other constitutive layers, the hybrid layer is laminated in vacuum. Therefore, curing necessary for providing the primer layer as in Japanese Patent Laid-Open No. 141001/1988 can be omitted, and in addition, the generation of foreign matter within the antireflection film can be reduced.

DETAILED DESCRIPTION OF THE INVENTION

The particulars shown herein are by way of example and for purposes of illustrative discussion of the various embodiments of the present invention only. In this regard, no attempt is made to show details of the invention in more detail than is necessary for a fundamental understanding of the invention, the description making apparent to those skilled in the art how the several forms of the invention may be embodied in practice.

In the optical element of the invention, a hybrid layer comprising an inorganic substance and an organic substance may be formed within the antireflection film through vapor deposition, whereby the flexibility of the antireflection film is increased, and the internal stress thereof is reduced. Thus, it is possible to provide an optical element having an antireflection film, which has superior adhesiveness, heat resistance and abrasion resistance, without impairing its impact resistance, that is comparable to those disclosed in Japanese Patent Laid-Open No. 141001/1988. In addition, since the optical element of the invention is not required to provide a primer layer to be formed by applying a primer solution, followed by heating in air, as in the technical teaching of Japanese Patent Laid-Open No. 141001/1988, curing can be omitted, contamination with foreign matter can be prevented, and the film thickness of the antireflection film can be controlled more accurately.

The hybrid layer can be formed in any layer of the antireflection film. In one embodiment of the invention, it is formed in a layer nearest to the plastic substrate and in a layer remotest from it, in order to more effectively realize the reflectance characteristics and the above-described physical properties, especially the impact resistance. It may be desirable that the antireflection film is formed of a plurality of layers. The hybrid layer may be formed in an ion-assisted process in order to obtain good film strength and adhesiveness.

For a suitable power range in the ion-assisted process, the acceleration voltage is in the range of from 50 V to 150 V, and the acceleration current is in the range of from 30 mA to 100 mA for ensuring better reaction. The ionizing gas to be used in the ion-assisted process may be argon (Ar) or a mixed gas of argon+oxygen in view of the reactivity and the oxidation resistance during the film formation.

In the optical element of the invention, a layer comprising at least one metal having a catalytic action during the formation of the hybrid layer mentioned below, which is selected from, for example, nickel (Ni), silver (Ag), platinum (Pt), niobium (Nb) and titanium (Ti), can be formed as a basic layer under the antireflection film for improving the adhesiveness. The basic layer is a metallic layer made of niobium for further enhancing the impact resistance. When the metallic layer is used as the basic layer, the reaction of the hybrid layer to be formed above the basic layer is likely to be promoted, thereby obtaining substances having an intramolecular network structure to improve the impact resistance.

For ensuring good adhesiveness between the plastic substrate and the basic layer and for ensuring good uniformity of the initial film morphology of the vapor deposition substance, an ion gun pretreatment may be carried out before the formation of the basic layer. As the ionizing gas in the ion gun pretreatment, oxygen, argon (Ar), etc. can be used. As a suitable power range in the pretreatment, the acceleration voltage is in the range of from 50 V to 200 V, and the acceleration current is in the range of from 50 mA to 150 mA from the standpoint of obtaining good adhesiveness and abrasion resistance.

In the invention, the antireflection film may be formed through vapor deposition. If desired, it can be formed through physical vapor deposition (PVD), chemical vapor deposition (CVD), sputtering, ion plating, plasma CVD or the like.

The constitutive layers other than the hybrid layer of the antireflection film are not specifically limited. In order to obtain good properties such as antireflection, it is preferred that a low-refraction layer is made of $SiO_2$ or a mixture of $SiO_2$ and $Al_2O_3$ and that a high-refraction layer is made of $Nb_2O_5$ or $TiO_2$.

Preferably, the inorganic substance to be used in the hybrid layer in the invention is $SiO_2$ alone, a mixture of $SiO_2$ and $Al_2O_3$, or at least one inorganic oxide selected from $Nb_2O_5$, $Ta_2O_5$, $TiO_2$, $ZrO_2$ and $Y_2O_3$.

A suitable organic substance to be used in the hybrid layer in the invention is a modified silicone oil. A suitable modified silicone oil has a number-average molecular weight of from 250 to 6,000 and has a structure of any of the following general formulae (a) to (d).

1. Modified at Side Chains:

(a) Modified silicone oil having an organic group introduced into the side chains of polysiloxane:

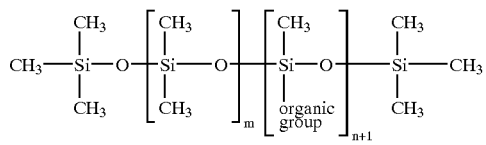

2. Modified at Both Ends:

(b) Modified silicone oil having an organic group introduced into both ends of polysiloxane:

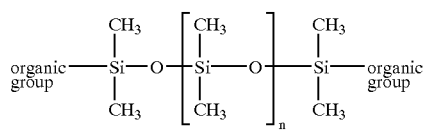

3. Modified at One End:

(c) Modified silicone oil having an organic group introduced into one end of polysiloxane:

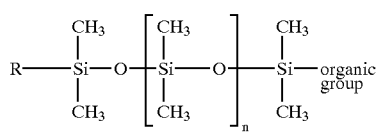

4. Modified at Side Chains and at Both Ends:

(d) Modified silicone oil having an organic group introduced into the side chains and both ends of polysiloxane:

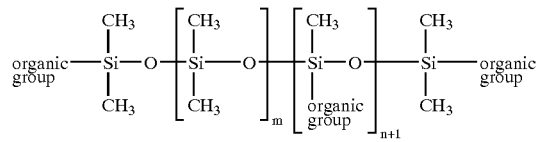

(In the general formulae (a) to (d), m and n each independently indicate an integer of 0 or more; and in the general formula (c), R represents an alkyl group having from 1 to 10 carbon atoms, an alkenyl group having from 2 to 10 carbon atoms, or an alkinyl group having from 2 to 10 carbon atoms. The compounds of the general formulae (a) and (d) can be either block copolymers or random copolymers.)

Depending on the type of the organic group introduced thereinto, the modified silicone oil is grouped into a reactive silicone oil and a non-reactive silicone oil.

In the reactive silicone oil, examples of the organic group include:

(1) an amino group,
(2) an epoxy group,
(3) a carboxyl group,
(4) a hydroxyl group-containing hydrocarbon group having 1 to 15 carbon atoms,
(5) a methacrylic group,
(6) a mercapto group,
(7) a phenol group,
(8) a $C_{1-15}$ alkoxy group,
(9) a hydrocarbon group having 1 to 15 carbon atoms carrying one or more of the substituents listed above, and
(10) an organic group containing a combination of two or more of the above groups (preferably a combination of amino group and alkoxy group, combination of epoxy group and polyether group, or combination of amino group and polyether group).

In the non-reactive silicone oil, examples of the organic group include:

(1) a poly($C_{2-15}$ alkylene)ether group, having 2 to 15 repeating units,
(2) a methylstyryl group,
(3) a $C_{1-15}$ alkyl group,
(4) a $C_{2-15}$ higher acid ester group,
(5) an ester of a fatty acid having 16 to 20 carbon atoms, and
(6) and a hydrocarbon group having 1 to 15 carbon atoms that is substituted with one or more fluorine atoms.

It is desirable that the number-average molecular weight of the modified silicone oil is in the range of from 250 to 6,000 from the standpoints of controlling the organic component in the hybrid layer and enhancing the strength of the film itself.

Another suitable organic substance in the hybrid layer is a compound of the following general formula (I):

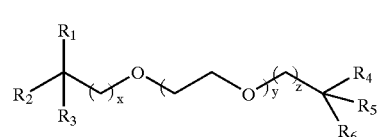

wherein x and z each independently represent an integer of 0 or more; y represents an integer of 1 or more; $R_1$ to $R_6$ each independently represent a hydrogen atom or an organic group selected from a methyl group, a hydrocarbon group having 1 to 15 carbon atoms containing an epoxy group, an amino group, a (meth)acrylic group, a hydroxyl group, a hydrocarbon group having 1 to 15 carbon atoms containing a carbonyl group, a vinyl group, a thiol group, a carbon-carbon triple bond-containing hydrocarbon group having 1 to 15 carbon atoms, an alkoxysilane group having from 1 to 15 carbon atoms, an alkylamino group having from 1 to 15 carbon atoms and a cyclic alkyl group having from 5 to 8 carbon atoms.

According to one embodiment of the invention, at least one of $R_1$ to $R_6$ is a sorbitan residue (derived from sorbitan by removing one hydrogen atom from it) or a sorbitan ester residue (derived from sorbitan ester by removing one hydrogen atom from it).

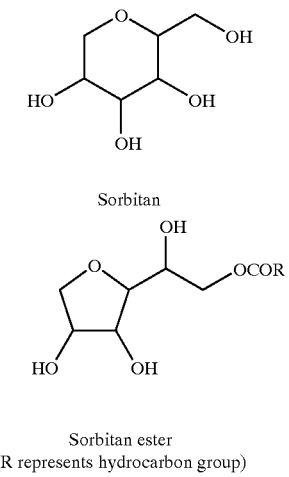

Sorbitan

Sorbitan ester
(R represents hydrocarbon group)

The hydrocarbon group represented by R contains preferably 10 to 20 carbon atoms. It may be branched or linear and it may contain one or more unsaturations.

The compound of the general formula (I) may be polyethylene glycol monobutyl monoglycidyl ether, polyethylene glycol diglycidyl ether, polyoxyethylene α,ω-bis-3-aminopropyl ether, polyethylene glycol sorbitan monolaurate, polyethylene glycol sorbitan monooleate or polyoxyethylene monoacrylate.

The number-average molecular weight of the compound of the general formula (I) may be in the range of from 250 to 6,000 taking into account the control of the organic component in the hybrid layer and the strength of the hybrid layer. The control of the organic component in the hybrid layer can be improved by selecting compounds of the general formula (I) having low molecular weights that may be in the range of 250 to 6000.

In the film formation of the organic substance in the invention, for the purpose of controlling the amount of the organic substance to be evaporated, it is desirable that the organic substance is diluted with a solvent and the resulting dilution is infiltrated into a bio-column filter and dried. The bio-column filter is preferably produced from sinter stainless and inorganic glass. The solvent is not specifically limited. Dimethyl ether is preferred for amine-terminated organic compounds; ethyl acetate is for epoxide-terminated organic compounds; trimethylethylsilane or diethyl ether is preferred for polysiloxane-based organic compounds of low polarity; and methanol is preferred for polyether-based organic compounds of high polarity, respectively.

As to the film formation, it is desirable that a porous material is heated to thereby vaporize and deposit the organic substance on the substrate to form the intended layer thereon. When the organic substance is dissolved in a solvent, and the amount of the resulting solution is controlled, the film thickness can be controlled. The heating device is not specifically limited. For example, a halogen heater, a resistance heater or a ceramic heater can be used.

The dissolved organic substance is charged into a suitable vessel, and heated and vaporized. Preferably, the vessel is made of a porous material, and the solution is infiltrated into it and heated. In that manner, the vapor deposition rate can be suitably controlled. More concretely, the porous material is preferably a sintered filter produced by sintering a metal powder of high thermal conductivity such as copper. From the standpoint of obtaining a suitable vapor deposition rate, the pore size of the porous material is generally in the range of from 40 to 200 μm, and preferably in the range of from 80 to 120 μm.

The vessel is heated at 200 to 300° C., and preferably 200 to 240° C. from the standpoint of obtaining a suitable vapor deposition rate.

The heating device may be provided with a shutter mechanism for controlling the film formation. Also, the heating device may be covered for preventing the film-forming substance from scattering therearound to contaminate the plastic substrate during the heating. For stable supply of the film-forming substance in the step of film formation, it is desirable that the bio-column filter is kept in an evaporation rate-controlling chamber having small holes. Regarding their shape, the holes are preferably oval for ensuring better distribution orientation of the film-forming organic substance.

Generally, the content of the organic substance in the hybrid layer in the film is in the range of from 0.02% by weight to 70% by weight taking into account the matter that a particularly good physical property-improving effect is obtained. A particularly preferred content of the organic substance is in the range of 0.5% by weight to 25% by weight.

The content of the organic substance in the hybrid layer in the film can be determined by, for example, previously grasping the refractive indices of the inorganic substance and organic substance and measuring the film thickness of the hybrid layer and the reflectance thereof. The content of the organic substance in the hybrid layer can be determined by means of interpolation from the refractive index of the hybrid layer, using of the refractive index of a layer consisting of the organic substance and the refractive index of a layer consisting of the inorganic substance as a basis.

In forming the hybrid layer, it is desirable that separate vapor deposition sources of inorganic and organic substances are simultaneously vaporized and deposited. The relative content of the organic substance can be controlled by varying the temperature and/or surface of the heating devices of the organic substance and/or of the inorganic substance. If the hybrid layer is to contain more than one inorganic substance or more than one organic substance, these are preferably vaporized in separate heating devices.

One embodiment of the layer constitution of the antireflection film formed on a plastic substrate in the invention is as follows:

1st layer: hybrid layer of $SiO_2+Al_2O_3+$organic substance (layer thickness, 10 to 180 nm),
2nd layer: $Nb_2O_5$ layer (layer thickness, 1 to 25 nm),
3rd layer: $SiO_2+Al_2O_3$ layer (layer thickness, 10 to 50 nm),
4th layer: $Nb_2O_5$ layer (layer thickness, 10 to 55 nm),
5th layer: $SiO_2+Al_2O_3$ layer (layer thickness, 10 to 50 nm),
6th layer: $Nb_2O_5$ layer (layer thickness, 10 to 120 nm), and
7th layer: hybrid layer of $SiO_2+Al_2O_3+$organic substance (layer thickness, 70 to 100 nm).

The ranges of the layer thickness mentioned above are preferred ones for the impact resistance, adhesiveness, heat resistance and abrasion resistance of the optical element having an antireflection film formed on a plastic substrate.

Another embodiment of the layer constitution of the antireflection film is as follows:

Basic layer: Nb layer (layer thickness, 1 to 5 nm),
1st layer: hybrid layer of SiO$_2$+Al$_2$O$_3$+organic substance (layer thickness, 10 to 180 nm),
2nd layer: Nb$_2$O$_5$ layer (layer thickness, 10 to 55 nm),
3rd layer: SiO$_2$+Al$_2$O$_3$ layer (layer thickness, 10 to 50 nm),
4th layer: Nb$_2$O$_5$ layer (layer thickness, 10 to 55 nm),
5th layer: SiO$_2$+Al$_2$O$_3$ layer (layer thickness, 10 to 50 nm),
6th layer: Nb$_2$O$_5$ layer (layer thickness, 10 to 120 nm), and
7th layer: hybrid layer of SiO$_2$+Al$_2$O$_3$+organic substance (layer thickness, 70 to 100 nm).

The ranges of the layer thickness mentioned above are preferred ones for the impact resistance, adhesiveness, heat resistance and abrasion resistance of the optical element having an antireflection film formed on a plastic substrate. For better properties, at least one layer in the film constitution may be formed in an ion-assisted process.

In one embodiment of the invention, the range of the refractive index of the hybrid layer of SiO$_2$+Al$_2$O$_3$+organic substance is from 1.450 to 1.485 from the standpoint of obtaining good abrasion resistance and impact resistance.

The material for the plastic substrate for use in the invention is not specifically limited, including, for example, methyl methacrylate homopolymers, copolymers of methyl methacrylate and one or more other monomers, diethylene glycol bisallyl carbonate homopolymers, copolymers of diethylene glycol bisallyl carbonate and one or more other monomers, sulfur-containing copolymers, halogen copolymers, polycarbonates, polystyrenes, polyvinyl chlorides, unsaturated polyesters, polyethylene terephthalates, polyurethanes, and polythiourethanes.

The optical element of the invention may have a cured film between the plastic substrate and the basic layer. For the cured film, in general, a composition that comprises metal oxide colloid particles and an organosilicon compound of the following general formula (II) is used:

(R$_7$)$_a$(R$_8$)$_b$Si(OR$_9$)$_{4-(a+b)}$     (II)

wherein R$_7$ and R$_8$ each independently represent an organic group selected from an alkyl group having from 1 to 8 carbon atoms, an alkenyl group having from 2 to 8 carbon atoms, an aryl group having from 6 to 8 carbon atoms, an acyl group having from 1 to 8 carbon atoms, a halogen atom, a glycidoxy group, an epoxy group, an amino group, a mercapto group, a methacryloxy group and a cyano group; R$_9$ represents an organic group selected from an alkyl group having from 1 to 8 carbon atoms, an acyl group having from 1 to 8 carbon atoms and an aryl group having from 6 to 10 carbon atoms; and a and b each independently represent an integer of 0 or 1.

Examples of the metal oxide colloid particles include those of tungsten oxide (WO$_3$), zinc oxide (ZnO), silicon oxide (SiO$_2$), aluminum oxide (Al$_2$O$_3$), titanium oxide (TiO$_2$), zirconium oxide (ZrO$_2$), tin oxide (SnO$_2$), beryllium oxide (BeO), and antimony oxide (Sb$_2$O$_5$). These metal oxides may be used alone or be combined herein.

Examples of the organosilicon compound of the general formula (II) include methyl silicate, ethyl silicate, n-propyl silicate, i-propyl silicate, n-butyl silicate, sec-butyl silicate, t-butyl silicate, tetraacetoxysilane, methyltrimethoxysilane, methyltriethoxysilane, methyltripropoxysilane, methyltriacetoxysilane, methyltributoxysilane, methyltripropoxysilane, methyltriamyloxysilane, methyltriphenoxysilane, methyltribenzyloxysilane, methyltriphenethyloxysilane, glycidoxymethyltrimethoxysilane, glycidoxymethyltriethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylmethyldiethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, γ-glycidoxypropylphenyldimethoxysilane, γ-glycidoxypropylphenyldiethoxysilane, ethyltrimethoxysilane, ethyltriethoxysilane, vinyltrimethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, N-(β-aminoethyl)-γ-aminopropyltrimethoxysilane, N-(β-aminoethyl)-γ-aminopropylmethyldimethoxysilane, γ-aminopropylmethyldimethoxysilane, N-(β-aminoethyl)-γ-aminopropyltriethoxysilane, N-(β-aminoethyl)-γ- aminopropylmethyldiethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptopropylmethyldiethoxysilane, methylvinyldimethoxysilane, and methylvinyldiethoxysilane.

In general, the composition to be used to obtain the cured film may contain between 1 and 20 weight % of the metal oxide colloid particles based on the total weight of the composition, and preferably between 5 and 15 weight %.

The coating solution to form the cured film can be formulated in a conventional manner. If desired, a curing catalyst as well as various organic solvents and surfactants can be contained for the purposes of improving the wettability during the application and improving the smoothness of the cured film. In addition, UV absorbents, antioxidants, light stabilizers, anti-aging agents, etc. can be added so far as the desired physical properties of the coating composition and the cured film are achieved.

The coating composition is cured by drying with hot air or by exposure to active energy rays. Preferably, it is cured in hot air at 70 to 200° C., more preferably at 90 to 150° C. Examples of the active energy rays include far-infrared rays, so that a damage by heat can be suppressed.

Examples of the method for forming a cured film made of the coating composition on a substrate include a method in which the coating composition is applied onto the substrate. The application can be carried out by means of any ordinary method such as dipping, spin coating or spraying. In view of the face accuracy dipping or spin coating is especially preferred.

EXAMPLES

The invention is described in more detail with reference to the following Examples, which, however, are not intended to restrict the invention.

The physical properties of the optical elements obtained in the following Examples and Comparative Examples were measured according to the methods mentioned below.

(1) Luminous Transmittance:

Using a spectrophotometer, U-3410 made by Hitachi, Ltd., the luminous transmittance, Y of a sample of a plastic lens having an antireflection film formed on both surfaces was measured.

(2) Luminous Reflectance:

Using a spectrophotometer, U-3410 made by Hitachi, Ltd., the luminous reflectance, Z of a sample of a plastic lens having an antireflection film formed on both surfaces was measured.

(3) Impact Resistance:

A plastic lens having a center thickness (CT) of 2.0 mm and a power of lens of −4.00 D was prepared and subjected to a drop ball test as defined by FDA (Food and Drug Administration). "O" indicates good samples; and "x" indicates rejected samples. The drop ball test was continued until the lens samples were broken, and the strength was confirmed as a maximum load. The weight of the ball was 14 g.

(4) Adhesiveness:

Using a cutting tool, the surface of a plastic lens was cut to have 100 cross-cuts of 1 mm×1 mm each. An adhesive tape, Cellotape was stuck on its cross-cut area, and peeled off at a stroke. The number of the remaining cross-cuts was counted and shown in the following Tables, in which (number of remaining cross-cuts)/100 indicates the adhesiveness.

(5) Abrasion Resistance:

The surface of a plastic lens was rubbed with steel wool under a load of 1 kgf/cm$^2$ applied thereto. After 10 strokes of rubbing, the surface condition of the plastic lens was evaluated according to the following criteria:

UA: Scratched little.

A: A few thin scratch marks found.

B: Many thin scratch marks and a few thick scratch marks found.

C: Many thin and thick scratch marks found.

D: Almost completely peeled (6) Heat Resistance:

A plastic lens was heated in a dry oven for 1 hour. The heating temperature at the start of the test was 60° C., and it was elevated at intervals of 5° C. The temperature at which it cracked was read.

(7) Alkali Resistance:

A plastic lens was dipped in an aqueous 10% NaOH solution at 20° C. for 1 hour, and its surface condition was evaluated according to the following criteria:

UA: Changed little.

A: A few peeled dots found.

B: Many peeled dots found everywhere on the surface.

C: Many peeled dots found everywhere on the surface, and a few peeled squares found.

D: Almost completely peeled.

Examples 1 to 20

90 parts by weight of colloidal silica (Snowtex-40 available from Nissan Chemical Industries, Ltd.), 81.6 parts by weight of methyltrimethoxysilane and 176 parts by weight of γ-glycidoxypropyltrimethoxysilane as organosilicon compounds, 2.0 parts by weight of 0.5 N hydrochloric acid, 20 parts by weight of acetic acid, and 90 parts by weight of water were charged into a glass container, and the solution was stirred at room temperature for 8 hours. The resulting solution was left at room temperature for 16 hours to obtain a hydrolyzed solution. To this solution were added 120 parts by weight of isopropyl alcohol, 120 parts by weight of n-butyl alcohol, 16 parts by weight of aluminum acetylacetone, 0.2 parts by weight of a silicone surfactant, and 0.1 parts by weight of a UV absorbent. The mixture was stirred at room temperature for 8 hours, and then aged at room temperature for 24 hours to obtain a coating solution.

A plastic lens substrate (made of diethylene glycol bisallyl carbonate, and having a refractive index of 1.50, a center thickness of 2.0 mm, a diameter of 70 mm and a power of lens of 0.00), which had been pretreated with an aqueous alkali solution, was dipped in the coating solution. After completion of dipping, the plastic lens was taken out at a pulling rate of 20 cm/min. Then, the plastic lens was heated at 120° C. for 2 hours to form a cured film (hard coat layer A). Next, the resulting plastic lens was subjected to an ion gun pretreatment using an Ar gas under the condition of the ion acceleration voltage as shown in Tables 1 to 10.

Next, under the conditions shown in Tables 1 to 10, an antireflection film composed of 1 st to 7th layers was formed on the hard coat layer A to obtain plastic lenses.

In forming the hybrid layer, the inorganic substance and the organic substance were almost simultaneously evaporated and deposited in a mode of controlled two-way vapor deposition. The organic substance was dissolved in an organic solvent, and the resulting solution was infiltrated into a sintered stainless steel-made filter (pore size, 80 to 100 μm, diameter: 18 mm, thickness: 3 mm). The ratio of the organic substance to the solvent was ¼ by weight, and the content of the organic substance and the solvent was 1 ml per one filter chip. The filter was set in a vacuum evaporation chamber and heated at 250° C. However, since the organic substance E was vaporized in an external heating tank, and its vapor was introduced into the vapor deposition chamber using a gas valve and a mass flow controller, no filter chip was used.

The structures of the products, organic substances A to E in the Tables are as follows.

Organic Substance A:

This is a reactive silicone oil, KF1001 (available from Shin-Etsu Silicone Co., Ltd.) of the general formula (a) in which the organic group is an epoxy group. The solvent is trimethylethylsilane, LS-865 (available from Shin-Etsu Chemical Co:, Ltd.).

Organic Substance B:

This is a reactive silicone oil, X22-4741 (available from Shin-Etsu Silicone Co., Ltd.) of the general formula (a) in which the organic group is an epoxy group and a polyether group. The solvent is ethyl acetate.

Organic Substance C:

This is a reactive silicone oil, X22-8008 (available from Shin-Etsu Silicone Co., Ltd.) of the general formula (a) in which the organic group is an aminoalkyl group. The solvent is diethyl ether.

Organic Substance D:

This is polyoxyethylene monoacrylate, AE-400 (available from NOF Corporation). The solvent is ethyl acetate.

Organic Substance E:

This is polyethylene glycol glycidyl ether, E-400 (available from NOF Corporaiton). No solvent is used.

The obtained plastic lenses were evaluated according to the test methods (1) to (7) mentioned above, and the results are shown in Tables 1 to 10. In the Tables, $\lambda$ indicates the wavelength of the light applied, and $\lambda$=500 nm. The refractive index of the hybrid layer was measured at $\lambda$=500 nm.

Comparative Examples 1 to 4

Plastic lenses were fabricated under the conditions shown in Tables 11 and 12, in which the hard coat layer and the functional film of the first to seventh layers were all formed of an inorganic substance only.

The plastic lenses were evaluated according to the test methods (1) to (7) mentioned above, and the results are shown in Tables 11 and 12.

Layers, which were produced without an ion assisted process, are indicated in the following tables by the sign "−" in the column "Ion gun setting". These layers were deposited through conventional vapour deposition.

TABLE 1-1

| | Example 1 | | Example 2 | |
|---|---|---|---|---|
| | Plastic lens substrate | | | |
| | Diethylene glycol bisallyl carbonate | | Diethylene glycol bisallyl carbonate | |
| | Hard Coat layer | | | |
| | Layer A | | Layer A | |
| | Setting for ion gun pretreatment | | | |
| | Acceleration voltage: 200 V, Acceleration current: 100 mA | | Acceleration voltage: 200 V, Acceleration current: 100 mA | |
| | Gas used | | | |
| | Ar | | Ar | |
| | Film type & Film thickness | Ion gun setting | Film type & Film thickness | Ion gun setting |
| 1st Layer | $SiO_2$ + $Al_2O_3$ + organic substance A: 0.25 $\lambda$<br>Layer refractive index: 1.468<br>Refractive index of $SiO_2$ + $Al_2O_3$: 1.486<br>Refractive index of organic substance A: 1.425<br>Content of organic substance: about 31 wt. % | 100 V, 70 mA<br>Ar gas | $SiO_2$ + $Al_2O_3$ + organic substance A: 0.25 $\lambda$<br>Layer refractive index: 1.468<br>Refractive index of $SiO_2$ + $Al_2O_3$: 1.486<br>Refractive index of organic substance A: 1.425<br>Content of organic substance: about 31 wt. % | 100 V, 70 mA<br>Ar gas |
| 2nd Layer | $Nb_2O_5$: 0.053 $\lambda$ | — | $Nb_2O_5$: 0.055 $\lambda$ | — |
| 3rd Layer | $SiO_2$ + $Al_2O_3$: 0.119 $\lambda$ | — | $SiO_2$ + $Al_2O_3$ + organic substance A: 0.1137 $\lambda$<br>Layer refractive index: 1.468<br>Refractive index of $SiO_2$ + $Al_2O_3$: 1.486<br>Refractive index of organic substance A: 1.425<br>Content of organic substance: about 31 wt. % | 100 V, 70 mA<br>Ar gas |
| 4th Layer | $Nb_2O_5$: 0.146 $\lambda$ | — | $Nb_2O_5$: 0.1427 $\lambda$ | — |
| 5th Layer | $SiO_2$ + $Al_2O_3$: 0.077 $\lambda$ | — | $SiO_2$ + $Al_2O_3$ + organic substance A: 0.0781 $\lambda$<br>Layer refractive index: 1.468<br>Refractive index of $SiO_2$ + $Al_2O_3$: 1.486<br>Refractive index of organic substance A: 1.425<br>Content of organic substance: about 31 wt. % | 100 V, 70 mA<br>Ar gas |

TABLE 1-1-continued

|  | Example 1 | Example 2 |
|---|---|---|
| Plastic lens substrate | Diethylene glycol bisallyl carbonate | Diethylene glycol bisallyl carbonate |
| Hard Coat layer | Layer A | Layer A |
| Setting for ion gun pretreatment | Acceleration voltage: 200 V, Acceleration current: 100 mA | Acceleration voltage: 200 V, Acceleration current: 100 mA |
| Gas used | Ar | Ar |

|  | Film type & Film thickness | Ion gun setting | Film type & Film thickness | Ion gun setting |
|---|---|---|---|---|
| 6th Layer | $Nb_2O_5$: 0.131 λ | — | $Nb_2O_5$: 0.128 λ | — |
| 7th Layer | $SiO_2 + Al_2O_3$ + organic substance A: 0.276 λ<br>Layer refractive index: 1.468<br>Refractive index of $SiO_2 + Al_2O_3$: 1.486<br>Refractive index of organic substance A: 1.425<br>Content of organic substance: about 31 wt. % | 100 V, 70 mA<br>Ar gas | $SiO_2 + Al_2O_3$ + organic substance A: 0.279 λ<br>Layer refractive index: 1.468<br>Refractive index of $SiO_2 + Al_2O_3$: 1.486<br>Refractive index of organic substance A: 1.425<br>Content of organic substance: about 31 wt. % | 100 V, 70 mA<br>Ar gas |
| Organic substance used | A. KF1001 made by Shin-Etsu Silicone Co., Ltd. | | A: KF1001 made by Shin-Etsu Silicone Co., Ltd. | |

TABLE 1-2

Evaluation of plastic lens performance

|  | Example 1 | Example 2 |
|---|---|---|
| Luminous reflectance, Y % | 0.82% | 0.80% |
| Luminous transmittance, Z % | 99.0% | 99.01% |
| Impact resistance | CT = 2.0, FDA O, Maximum 28 g | CT = 2.0, FDA O, Maximum 36 g |
| Adhesiveness | 100/100 | 100/100 |
| Abrasion resistance | UA | UA to A |
| Heat resistance | 95° C. | 100° C. |
| Alkali resistance | UA | UA to A |

TABLE 2-1

|  | Example 3 | Example 4 |
|---|---|---|
| Plastic lens substrate | Diethylene glycol bisallyl carbonate | Diethylene glycol bisallyl carbonate |
| Hard Coat layer | Layer A | Layer A |
| Setting for ion gun pretreatment | Acceleration voltage: 200 V, Acceleration current: 100 mA | Acceleration voltage: 200 V, Acceleration current: 100 mA |
| Gas used | Ar | Ar |

|  | Film type & Film thickness | Ion gun setting | Film type & Film thickness | Ion gun setting |
|---|---|---|---|---|
| 1st Layer | $SiO_2 + Al_2O_3$ + organic substance A: 0.25 λ<br>Layer refractive index: 1.468<br>Refractive index of $SiO_2 + Al_2O_3$: 1.486<br>Refractive index of organic substance A: 1.425<br>Content of organic substance: about 31 wt. % | 100 V, 70 mA<br>Ar gas | $SiO_2 + Al_2O_3$ + organic substance A: 0.25 λ<br>Layer refractive index: 1.468<br>Refractive index of $SiO_2 + Al_2O_3$: 1.486<br>Refractive index of organic substance A: 1.425<br>Content of organic substance: about 31 wt. % | 100 V, 70 mA<br>Ar gas |

TABLE 2-1-continued

|  | Example 3 | | Example 4 | |
|---|---|---|---|---|
|  | Plastic lens substrate | | | |
|  | Diethylene glycol bisallyl carbonate | | Diethylene glycol bisallyl carbonate | |
|  | Hard Coat layer | | | |
|  | Layer A | | Layer A | |
|  | Setting for ion gun pretreatment | | | |
|  | Acceleration voltage: 200 V, Acceleration current: 100 mA | | Acceleration voltage: 200 V, Acceleration current: 100 mA | |
|  | Gas used | | | |
|  | Ar | | Ar | |
|  | Film type & Film thickness | Ion gun setting | Film type & Film thickness | Ion gun setting |
| 2nd Layer | $Nb_2O_5$: 0.0568 λ | 350 V, 130 mA $O_2/Ar$, 8/2 | $Nb_2O_5$: 0.0581 λ | 350 V, 130 mA $O_2/Ar$, 8/2 |
| 3rd Layer | $SiO_2 + Al_2O_3$: 0.1205 λ | — | $SiO_2 + Al_2O_3$ + organic substance A: 0.1131 λ<br>Layer refractive index: 1.468<br>Refractive index of $SiO_2 + Al_2O_3$: 1.486<br>Refractive index of organic substance A: 1.425<br>Content of organic substance: about 31 wt. % | 100 V, 70 mA Ar gas |
| 4th Layer | $Nb_2O_5$: 0.1469 λ | 350 V, 130 mA $O_2/Ar$, 8/2 | $Nb_2O_5$: 0.1465 λ | 350 V, 130 mA $O_2/Ar$, 8/2 |
| 5th Layer | $SiO_2 + Al_2O_3$: 0.0788 λ | — | $SiO_2 + Al_2O_3$ + organic substance A: 0.0768 λ<br>Layer refractive index: 1.468<br>Refractive index of $SiO_2 + Al_2O_3$: 1.486<br>Refractive index of organic substance A: 1.425<br>Content of organic substance: about 31 wt. % | 100 V, 70 mA Ar gas |
| 6th Layer | $Nb_2O_5$: 0.1210 λ | 350 V, 130 mA $O_2/Ar$, 8/2 | $Nb_2O_5$: 0.125 λ | 350 V, 130 mA $O_2/Ar$, 8/2 |
| 7th Layer | $SiO_2 + Al_2O_3$ + organic substance A: 0.274 λ<br>Layer refractive index: 1.468<br>Refractive index of $SiO_2 + Al_2O_3$: 1.486<br>Refractive index of organic substance A: 1.425<br>Content of organic substance: about 31 wt. % | 100 V, 70 mA Ar gas | $SiO_2 + Al_2O_3$ + organic substance A: 0.279 λ<br>Layer refractive index: 1.468<br>Refractive index of $SiO_2 + Al_2O_3$: 1.486<br>Refractive index of organic substance A: 1.425<br>Content of organic substance: about 31 wt. % | 100 V, 70 mA Ar gas |
| Organic substance used | A: KF1001 made by Shin-Etsu Silicone Co., Ltd. | | A: KF1001 made by Shin-Etsu Silicone Co., Ltd. | |

TABLE 2-2

| Evaluation of plastic lens performance | | |
|---|---|---|
|  | Example 3 | Example 4 |
| Luminous reflectance, Y % | 0.72% | 0.70% |
| Luminous transmittance, Z % | 99.10% | 99.11% |
| Impact resistance | CT = 2.0, FDA O, Maximum 28 g | CT = 2.0, FDA O, Maximum 36 g |
| Adhesiveness | 100/100 | 100/100 |
| Abrasion resistance | UA | UA to A |
| Heat resistance | 100° C. | 110° C. |
| Alkali resistance | UA | UA to A |

TABLE 3-1

|  | Example 5 | | Example 6 | |
|---|---|---|---|---|
| | Plastic lens substrate | | | |
| | Diethylene glycol bisallyl carbonate | | Diethylene glycol bisallyl carbonate | |
| | Hard Coat layer | | | |
| | Layer A | | Layer A | |
| | Setting for ion gun pretreatment | | | |
| | Acceleration voltage: 200 V, Acceleration current: 100 mA | | Acceleration voltage: 200 V, Acceleration current: 100 mA | |
| | Gas used | | | |
| | Ar | | Ar | |
| | Film type & Film thickness | Ion gun setting | Film type & Film thickness | Ion gun setting |
| 1st Layer | $SiO_2 + Al_2O_3$ + organic substance B: 0.25 λ<br>Layer refractive index: 1.465<br>Refractive index of $SiO_2 + Al_2O_3$: 1.486<br>Refractive index of organic substance B: 1.427<br>Content of organic substance: about 37 wt. % | 100 V, 70 mA<br>Ar gas | $SiO_2 + Al_2O_3$ + organic substance B: 0.25 λ<br>Layer refractive index: 1.465<br>Refractive index of $SiO_2 + Al_2O_3$: 1.486<br>Refractive index of organic substance B: 1.427<br>Content of organic substance: about 37 wt. % | 100 V, 70 mA<br>Ar gas |
| 2nd Layer | $Nb_2O_5$: 0.053 λ | — | $Nb_2O_5$: 0.055 λ | — |
| 3rd Layer | $SiO_2 + Al_2O_3$: 0.119 λ | — | $SiO_2 + Al_2O_3$ + organic substance B: 1.1137 λ<br>Layer refractive index: 1.465<br>Refractive index of $SiO_2 + Al_2O_3$: 1.486<br>Refractive index of organic substance B: 1.427<br>Content of organic substance: about 37 wt. % | 100 V, 70 mA<br>Ar gas |
| 4th Layer | $Nb_2O_5$: 0.146 λ | — | $Nb_2O_5$: 0.1427 λ | — |
| 5th Layer | $SiO_2 + Al_2O_3$: 0.077 λ | — | $SiO_2 + Al_2O_3$ + organic substance B: 0.0781 λ<br>Layer refractive index: 1.465<br>Refractive index of $SiO_2 + Al_2O_3$: 1.486<br>Refractive index of organic substance B: 1.427<br>Content of organic substance: about 37 wt. % | 100 V, 70 mA<br>Ar gas |
| 6th Layer | $Nb_2O_5$: 0.131 λ | — | $Nb_2O_5$: 0.128 λ | — |
| 7th Layer | $SiO_2 + Al_2O_3$ + organic substance B: 0.276 λ<br>Layer refractive index: 1.465<br>Refractive index of $SiO_2 + Al_2O_3$: 1.486<br>Refractive index of organic substance B: 1.427<br>Content of organic substance. about 37 wt. % | 100 V, 70 mA<br>Ar gas | $SiO_2 + Al_2O_3$ + organic substance B: 0.279 λ<br>Layer refractive index: 1.465<br>Refractive index of $SiO_2 + Al_2O_3$: 1.486<br>Refractive index of organic substance B: 1.427<br>Content of organic substance: about 37 wt. % | 100 V, 70 mA<br>Ar gas |
| Organic substance used | B: X22-4741 made by Shin-Etsu Silicone Co., Ltd. | | B: X22-4741 made by Shin-Etsu Silicone Co., Ltd. | |

TABLE 3-2

Evaluation of plastic lens performance

| | Example 5 | Example 6 |
|---|---|---|
| Luminous reflectance, Y % | 0.82% | 0.80% |
| Luminous transmittance, Z % | 99.0% | 99.01% |
| Impact resistance | CT = 2.0, FDA O, Maximum 45 g | CT = 2.0, FDA O, Maximum 50 g |
| Adhesiveness | 100/100 | 100/100 |
| Abrasion resistance | UA | UA to A |
| Heat resistance | 95° C. | 100° C. |
| Alkali resistance | UA | UA to A |

TABLE 4-1

| | Example 7 | | Example 8 | |
|---|---|---|---|---|
| | Plastic lens substrate | | | |
| | Diethylene glycol bisallyl carbonate | | Diethylene glycol bisallyl carbonate | |
| | Hard Coat layer | | | |
| | Layer A | | Layer A | |
| | Setting for ion gun pretreatment | | | |
| | Acceleration voltage: 200 V, Acceleration current: 100 mA | | Acceleration voltage: 200 V, Acceleration current: 100 mA | |
| | Gas used | | | |
| | Ar | | Ar | |
| | Film type & Film thickness | Ion gun setting | Film type & Film thickness | Ion gun setting |
| 1st Layer | $SiO_2 + Al_2O_3$ + organic substance B: 0.25 λ Layer refractive index: 1.465 Refractive index of $SiO_2 + Al_2O_3$: 1.486 Refractive index of organic substance B: 1.427 Content of organic substance: about 37 wt. % | 100 V, 70 mA Ar gas | $SiO_2 + Al_2O_3$ + organic substance B: 0.25 λ Layer refractive index: 1.465 Refractive index of $SiO_2 + Al_2O_3$: 1.486 Refractive index of organic substance B: 1.427 Content of organic substance: about 37 wt. % | 100 V, 70 mA Ar gas |
| 2nd Layer | $Nb_2O_5$: 0.0568 λ | 350 V, 130 mA $O_2$/Ar, 8/2 | $Nb_2O_5$: 0.0581 λ | 350 V, 130 mA $O_2$/Ar, 8/2 |
| 3rd Layer | $SiO_2 + Al_2O_3$: 0.1205 λ | — | $SiO_2 + Al_2O_3$ + organic substance B: 0.1131 λ Layer refractive index: 1.465 Refractive index of $SiO_2 + Al_2O_3$: 1.486 Refractive index of organic substance B: 1.427 Content of organic substance: about 37 wt. % | 100 V, 70 mA Ar gas |
| 4th Layer | $Nb_2O_5$: 0.1469 λ | 350 V, 130 mA $O_2$/Ar, 8/2 | $Nb_2O_5$: 0.1465 λ | 350 V, 130 mA $O_2$/Ar, 8/2 |
| 5th Layer | $SiO_2 + Al_2O_3$, 0.0788 λ | — | $SiO_2 + Al_2O_3$ + organic substance B: 0.0768 λ Layer refractive index: 1.465 Refractive index of $SiO_2 + Al_2O_3$: 1.486 Refractive index of organic substance B: 1.427 Content of organic substance: about 37 wt. % | 100 V, 70 mA Ar gas |
| 6th Layer | $Nb_2O_5$: 0.1210 λ | 350 V, 130 mA $O_2$/Ar, 8/2 | $Nb_2O_5$: 0.125 λ | 350 V, 130 mA $O_2$/Ar, 8/2 |
| 7th Layer | $SiO_2 + Al_2O_3$ + organic substance B: 0.274 λ Layer refractive index: 1.465 Refractive index of $SiO_2 + Al_2O_3$: 1.486 Refractive index of organic substance B: 1.427 Content of organic substance: about 37 wt. % | 100 V, 70 mA Ar gas | $SiO_2 + Al_2O_3$ + organic substance B: 0.279 λ Layer refractive index: 1.465 Refractive index of $SiO_2 + Al_2O_3$: 1.486 Refractive index of organic substance B: 1.427 Content of organic substance: about 37 wt. % | 100 V, 70 mA Ar gas |
| Organic substance used | B: X22-4741 made by Shin-Etsu Silicone Co., Ltd. | | B: X22-4741 made by Shin-Etsu Silicone Co., Ltd | |

TABLE 4-2

| Evaluation of plastic lens performance | | |
|---|---|---|
| | Example 7 | Example 8 |
| Luminous reflectance, Y % | 0.72% | 0.70% |
| Luminous transmittance, Z % | 99.1% | 99.11% |
| Impact resistance | CT = 2.0, FDA O, Maximum 45 g | CT = 2.0, FDA O, Maximum 50 g |
| Adhesiveness | 100/100 | 100/100 |
| Abrasion resistance | UA | UA to A |
| Heat resistance | 95° C. | 100° C. |
| Alkali resistance | UA | UA to A |

TABLE 5-1

|  | Example 9 | | Example 10 | |
|---|---|---|---|---|
| Plastic lens substrate | Diethylene glycol bisallyl carbonate | | Diethylene glycol bisallyl carbonate | |
| Hard Coat layer | Layer A | | Layer A | |
| Setting for ion gun pretreatment | Acceleration voltage: 200 V, Acceleration current: 100 mA | | Acceleration voltage: 200 V, Acceleration current: 100 mA | |
| Gas used | Ar | | Ar | |
|  | Film type & Film thickness | Ion gun setting | Film type & Film thickness | Ion gun setting |
| 1st Layer | $SiO_2 + Al_2O_3$ + organic substance B: 0.25 λ<br>Layer refractive index: 1.465<br>Refractive index of $SiO_2 + Al_2O_3$: 1.486<br>Refractive index of organic substance B: 1.427<br>Content of organic substance: about 37 wt. % | 100 V, 70 mA<br>Ar gas | $SiO_2 + Al_2O_3$ + organic substance B: 0.25 λ<br>Layer refractive index: 1.465<br>Refractive index of $SiO_2 + Al_2O_3$: 1.486<br>Refractive index of organic substance B: 1.427<br>Content of organic substance: about 37 wt. % | 100 V, 70 mA<br>Ar gas |
| 2nd Layer | $Nb_2O_5$: 0.053 λ | — | $Nb_2O_5$: 0.055 λ | — |
| 3rd Layer | $SiO_2 + Al_2O_3$: 0.119 λ | — | $SiO_2 + Al_2O_3$ + organic substance B: 2.1137 λ<br>Layer refractive index: 1.465<br>Refractive index of $SiO_2 + Al_2O_3$: 1.486<br>Refractive index of organic substance B: 1.427<br>Content of organic substance: about 37 wt. % | 100 V, 70 mA<br>Ar gas |
| 4th Layer | $Nb_2O_5$: 0.146 λ | — | $Nb_2O_5$: 0.1427 λ | — |
| 5th Layer | $SiO_2 + Al_2O_3$: 0.077 λ | — | $SiO_2 + Al_2O_3$ + organic substance B: 0.0781 λ<br>Layer refractive index: 1.465<br>Refractive index of $SiO_2 + Al_2O_3$: 1.486<br>Refractive index of organic substance B: 1.427<br>Content of organic substance: about 37 wt. % | 100 V, 70 mA<br>Ar gas |
| 6th Layer | $Nb_2O_5$: 0.131 λ | — | $Nb_2O_5$: 0.128 λ | — |
| 7th Layer | $SiO_2 + Al_2O_3$ + organic substance B + organic substance C: 0.276 λ<br>Layer refractive index: 1.468<br>Refractive index of $SiO_2 + Al_2O_3$: 1.486<br>Refractive index of organic substance B: 1.427<br>Refractive index of organic substance C: 1.435<br>Content of organic substances B & C: about 35 wt. % | 100 V, 70 mA<br>Ar gas | $SiO_2 + Al_2O_3$ + organic substance B + organic substance C: 0.279 λ<br>Layer refractive index: 1.468<br>Refractive index of $SiO_2 + Al_2O_3$: 1.486<br>Refractive index of organic substance B: 1.427<br>Refractive index of organic substance C: 1.435<br>Content of organic substances B & C: about 35 wt. % | 100 V, 70 mA<br>Ar gas |
| Organic substance used | B: X22-4741 made by Shin-Etsu Silicone Co., Ltd.<br>C: X22-8008 made by Shin-Etsu Silicone Co., Ltd. | | B: X22-4741 made by Shin-Etsu Silicone Co., Ltd.<br>C: X22-8008 made by Shin-Etsu Silicone Co., Ltd. | |

TABLE 5-2

| Evaluation of plastic lens performance | | |
|---|---|---|
|  | Example 9 | Example 10 |
| Luminous reflectance, Y % | 0.82% | 0.80% |
| Luminous transmittance, Z % | 99.0% | 99.01% |
| Impact resistance | CT = 2.0, FDA O, Maximum 50 g | CT = 2.0, FDA O, Maximum 67 g |
| Adhesiveness | 100/100 | 100/100 |
| Abrasion resistance | UA | UA to A |
| Heat resistance | 95° C. | 100° C. |
| Alkali resistance | UA | UA to A |

TABLE 6-1

|  | Example 11 | | Example 12 | |
| --- | --- | --- | --- | --- |
| Plastic lens substrate | Diethylene glycol bisallyl carbonate | | Diethylene glycol bisallyl carbonate | |
| Hard Coat layer | Layer A | | Layer A | |
| Setting for ion gun pretreatment | Acceleration voltage: 200 V, Acceleration current: 100 mA | | Acceleration voltage: 200 V, Acceleration current: 100 mA | |
| Gas used | Ar | | Ar | |
|  | Film type & Film thickness | Ion gun setting | Film type & Film thickness | Ion gun setting |
| 1st Layer | $SiO_2 + Al_2O_3$ + organic substance B: 0.25 λ<br>Layer refractive index: 1.465<br>Refractive index of $SiO_2 + Al_2O_3$: 1.486<br>Refractive index of organic substance B: 1.427<br>Content of organic substance: about 37 wt. % | 100 V, 70 mA<br>Ar gas | $SiO_2 + Al_2O_3$ + organic substance B: 0.25 λ<br>Layer refractive index: 1.465<br>Refractive index of $SiO_2 + Al_2O_3$: 1.486<br>Refractive index of organic substance B: 1.427<br>Content of organic substance: about 37 wt. % | 100 V, 70 mA<br>Ar gas |
| 2nd Layer | $Nb_2O_5$: 0.0568 λ | 350 V, 130 mA<br>$O_2$/Ar, 8/2 | $Nb_2O_5$: 0.0581 λ | 350 V, 130 mA<br>$O_2$/Ar, 8/2 |
| 3rd Layer | $SiO_2 + Al_2O_3$: 0.1205 λ | — | $SiO_2 + Al_2O_3$ + organic substance B: 0.1131 λ<br>Layer refractive index: 1.465<br>Refractive index of $SiO_2 + Al_2O_3$: 1.486<br>Refractive index of organic substance B: 1.427<br>Content of organic substance: about 37 wt. % | 100 V, 70 mA<br>Ar gas |
| 4th Layer | $Nb_2O_5$: 0.1469 λ | 350 V, 130 mA<br>$O_2$/Ar, 8/2 | $Nb_2O_5$: 0.1465 λ | 350 V, 130 mA<br>$O_2$/Ar, 8/2 |
| 5th Layer | $SiO_2 + Al_2O_3$: 0.0788 λ | — | $SiO_2 + Al_2O_3$ + organic substance B: 0.0768 λ<br>Layer refractive index 1.465<br>Refractive index of $SiO_2 + Al_2O_3$: 1.486<br>Refractive index of organic substance B: 1.427<br>Content of organic substance: about 37 wt. % | 100 V, 70 mA<br>Ar gas |
| 6th Layer | $Nb_2O_5$: 0.1210 λ | 350 V, 130 mA<br>$O_2$/Ar, 8/2 | $Nb_2O_5$: 0.125 λ | 350 V, 130 mA<br>$O_2$/Ar, 8/2 |
| 7th Layer | $SiO_2 + Al_2O_3$ + organic substance B + organic substance C: 0.274 λ<br>Layer refractive index: 1.468<br>Refractive index of $SiO_2 + Al_2O_3$: 1.486<br>Refractive index of organic substance B 1.427<br>Refractive index of organic substance C: 1.435<br>Content of organic substances B & C: about 35 wt. % | 100 V, 70 mA<br>Ar gas | $SiO_2 + Al_2O_3$ + organic substance B + organic substance C: 0.279 λ<br>Layer refractive index: 1.468<br>Refractive index of $SiO_2 + Al_2O_3$: 1.486<br>Refractive index of organic substance B. 1.427<br>Refractive index of organic substance C: 1.435<br>Content of organic substances B & C: about 35 wt. % | 100 V, 70 mA<br>Ar gas |
| Organic substance used | B: X22-4741 made by Shin-Etsu Silicone Co., Ltd.<br>C: X22-8008 made by Shin-Etsu Silicone Co., Ltd. | | B: X22-4741 made by Shin-Etsu Silicone Co., Ltd.<br>C: X22-8008 made by Shin-Etsu Silicone Co., Ltd. | |

TABLE 6-2

| Evaluation of plastic lens performance | | |
| --- | --- | --- |
|  | Example 11 | Example 12 |
| Luminous reflectance, Y % | 0.72% | 0.70% |
| Luminous transmittance, Z % | 99.1% | 99.11% |
| Impact resistance | CT = 2.0, FDA O,<br>Maximum 50 g | CT = 2.0, FDA O,<br>Maximum 67 g |
| Adhesiveness | 100/100 | 100/100 |
| Abrasion resistance | UA | UA to A |
| Heat resistance | 100° C. | 110° C. |
| Alkali resistance | UA | UA to A |

TABLE 7-1

| | Example 13 | | Example 14 | |
|---|---|---|---|---|
| Plastic lens substrate | | | | |
| | Diethylene glycol bisallyl carbonate | | Diethylene glycol bisallyl carbonate | |
| Hard Coat layer | | | | |
| | Layer A | | Layer A | |
| Setting for ion gun pretreatment | | | | |
| | Acceleration voltage: 200 V, Acceleration current: 100 mA | | Acceleration voltage: 200 V, Acceleration current: 100 mA | |
| Gas used | | | | |
| | Ar | | Ar | |
| | Film type & Film thickness | Ion gun setting | Film type & Film thickness | Ion gun setting |
| 1st Layer | SiO$_2$ + Al$_2$O$_3$ + organic substance D: 0.25 λ Layer refractive index: 1.462 Refractive index of SiO$_2$ + Al$_2$O$_3$: 1.486 Refractive index of organic substance D: 1.420 Content of organic substance: about 30 wt. % | 100 V, 70 mA Ar gas | SiO$_2$ + Al$_2$O$_3$ + organic substance D: 0.25 λ Layer refractive index: 1.462 Refractive index of SiO$_2$ + Al$_2$O$_3$: 1.486 Refractive index of organic substance D: 1.420 Content of organic substance: about 30 wt. % | 100 V, 70 mA Ar gas |
| 2nd Layer | Nb$_2$O$_5$: 0.053 λ | — | Nb$_2$O$_5$: 0.055 λ | — |
| 3rd Layer | SiO$_2$ + Al$_2$O$_3$: 0.119 λ | — | SiO$_2$ + Al$_2$O$_3$ + organic substance D: 0.1137 λ Layer refractive index: 1.462 Refractive index of SiO$_2$ + Al$_2$O$_3$: 1.486 Refractive index of organic substance D: 1.420 Content of organic substance: about 30 wt. % | 100 V, 70 mA Ar gas |
| 4th Layer | Nb$_2$O$_5$: 0.146 λ | — | Nb$_2$O$_5$: 0.1427 λ | — |
| 5th Layer | SiO$_2$ + Al$_2$O$_3$: 0.077 λ | — | SiO$_2$ + Al$_2$O$_3$ + organic substance D: 0.0781 λ Layer refractive index: 1.462 Refractive index of SiO$_2$ + Al$_2$O$_3$: 1.486 Refractive index of organic substance D: 1.420 Content of organic substance | 100 V, 70 mA Ar gas |
| 6th Layer | Nb$_2$O$_5$: 0.131 λ | — | Nb$_2$O$_5$: 0.128 λ | — |
| 7th Layer | SiO$_2$ + Al$_2$O$_3$ + organic substance D: 0.276 λ Layer refractive index: 1.462 Refractive index of SiO$_2$ + Al$_2$O$_3$: 1.486 Refractive index of organic substance D: 1.420 Content of organic substance: about 30 wt. % | 100 V, 70 mA Ar gas | SiO$_2$ + Al$_2$O$_3$ + organic substance D: 0.279 λ Layer refractive index. 1.462 Refractive index of SiO$_2$ + Al$_2$O$_3$: 1.486 Refractive index of organic substance D: 1.420 Content of organic substance: about 30 wt. % | 100 V, 70 mA Ar gas |
| Organic substance used | D: AE-400 (Blemmer) made of NOF Corporation | | D: AE-400 (Blemmer) made of NOF Corporation | |

TABLE 7-2

Evaluation of plastic lens performance

| | Example 13 | Example 14 |
|---|---|---|
| Luminous reflectance, Y % | 0.81% | 0.78% |
| Luminous transmittance, Z % | 99.0% | 99.02% |
| Impact resistance | CT = 2.0, FDA O, Maximum 28 g | CT = 2.0, FDA O, Maximum 36 g |
| Adhesiveness | 100/100 | 100/100 |
| Abrasion resistance | UA | UA to A |
| Heat resistance | 95° C. | 100° C. |
| Alkali resistance | UA | UA to A |

TABLE 8-1

|  | Example 15 | | Example 16 | |
|---|---|---|---|---|
| Plastic lens substrate | | | | |
|  | Diethylene glycol bisallyl carbonate | | Diethylene glycol bisallyl carbonate | |
| Hard Coat layer | | | | |
|  | Layer A | | Layer A | |
| Setting for ion gun pretreatment | | | | |
|  | Acceleration voltage: 200 V, Acceleration current: 100 mA | | Acceleration voltage: 200 V, Acceleration current: 100 mA | |
| Gas used | | | | |
|  | Ar | | Ar | |
|  | Film type & Film thickness | Ion gun setting | Film type & Film thickness | Ion gun setting |
| 1st Layer | $SiO_2 + Al_2O_3$ + organic substance D: 0.25 λ<br>Layer refractive index: 1.462<br>Refractive index of $SiO_2 + Al_2O_3$: 1.486<br>Refractive index of organic substance D: 1.420<br>Content of organic substance: about 30 wt. % | 100 V, 70 mA<br>Ar gas | $SiO_2 + Al_2O_3$ + organic substance D: 0.25 λ<br>Layer refractive index: 1.462<br>Refractive index of $SiO_2 + Al_2O_3$: 1.486<br>Refractive index of organic substance D: 1.420<br>Content of organic substance: about 30 wt. % | 100 V, 70 mA<br>Ar gas |
| 2nd Layer | $Nb_2O_5$: 0.0568 λ | 350 V, 130 mA<br>$O_2$/Ar, 8/2 | $Nb_2O_5$: 0.0581 λ | 350 V, 130 mA<br>$O_2$/Ar, 8/2 |
| 3rd Layer | $SiO_2 + Al_2O_3$: 0.1205 λ | — | $SiO_2 + Al_2O_3$ + organic substance D: 0.1131 λ<br>Layer refractive index: 1.462<br>Refractive index of $SiO_2 + Al_2O_3$: 1.486<br>Refractive index of organic substance D: 1.420<br>Content of organic substance: about 30 wt. % | 100 V, 70 mA<br>Ar gas |
| 4th Layer | $Nb_2O_5$: 0.1469 λ | 350 V, 130 mA<br>$O_2$/Ar, 8/2 | $Nb_2O_5$: 0.1465 λ | 350 V, 130 mA<br>$O_2$/Ar, 8/2 |
| 5th Layer | $SiO_2 + Al_2O_3$: 0.0788 λ | — | $SiO_2 + Al_2O_3$ + organic substance D: 0.0768 λ<br>Layer refractive index: 1.462<br>Refractive index of $SiO_2 + Al_2O_3$: 1.486<br>Refractive index of organic substance D: 1.420<br>Content of organic substance: about 30 wt. % | 100 V, 70 mA<br>Ar gas |
| 6th Layer | $Nb_2O_5$: 0.1210 λ | 350 V, 130 mA<br>$O_2$/Ar, 8/2 | $Nb_2O_5$: 0.125 λ | 350 V, 130 mA<br>$O_2$/Ar, 8/2 |
| 7th Layer | $SiO_2 + Al_2O_3$ + organic substance D: 0.274 λ<br>Layer refractive index: 1.462<br>Refractive index of $SiO_2 + Al_2O_3$: 1.486<br>Refractive index of organic substance D: 1.420<br>Content of organic substance: about 30 wt. % | 100 V, 70 mA<br>Ar gas | $SiO_2 + Al_2O_3$ + organic substance D: 0.279 λ<br>Layer refractive index: 1.462<br>Refractive index of $SiO_2 + Al_2O_3$: 1.486<br>Refractive index of organic substance D: 1.420<br>Content of organic substance: about 30 wt. % | 100 V, 70 mA<br>Ar gas |
| Organic substance used | D: AE-400 (Blemmer) made of NOF Corporation | | D: AE-400 (Blemmer) made of NOF Corporation | |

TABLE 8-2

| Evaluation of plastic lens performance | | |
|---|---|---|
|  | Example 15 | Example 16 |
| Luminous reflectance, Y % | 0.72% | 0.70% |
| Luminous transmittance, Z % | 99.10% | 99.11% |
| Impact resistance | CT = 2.0, FDA O,<br>Maximum 28 g | CT = 2.0, FDA O,<br>Maximum 36 g |
| Adhesiveness | 100/100 | 100/100 |
| Abrasion resistance | UA | UA to A |
| Heat resistance | 100° C. | 110° C. |
| Alkali resistance | UA | UA to A |

TABLE 9-1

| | Example 17 | | Example 18 | |
|---|---|---|---|---|
| | Plastic lens substrate | | | |
| | Diethylene glycol bisallyl carbonate | | Diethylene glycol bisallyl carbonate | |
| | Hard Coat layer | | | |
| | Layer A | | Layer A | |
| | Setting for ion gun pretreatment | | | |
| | Acceleration voltage: 200 V, Acceleration current: 100 mA | | Acceleration voltage: 200 V, Acceleration current: 100 mA | |
| | Gas used | | | |
| | Ar | | Ar | |
| | Film type & Film thickness | Ion gun setting | Film type & Film thickness | Ion gun setting |
| 1st Layer | $SiO_2 + Al_2O_3$ + organic substance E: 0.25 λ Layer refractive index: 1.468 Refractive index of $SiO_2 + Al_2O_3$: 1.486 Refractive index of organic substance E: 1.437 Content of organic substance: about 28 wt. % | 70 V, 70 mA Ar gas | $SiO_2 + Al_2O_3$ + organic substance E: 0.25 λ Layer refractive index: 1.468 Refractive index of $SiO_2 + Al_2O_3$: 1.486 Refractive index of organic substance E: 1.437 Content of organic substance: about 28 wt. % | 70 V, 70 mA Ar gas |
| 2nd Layer | $Nb_2O_5$: 0.053 λ | — | $Nb_2O_5$: 0.055 λ | — |
| 3rd Layer | $SiO_2 + Al_2O_3$: 0119 λ | | $SiO_2 + Al_2O_3$ + organic substance E: 0.1137 λ Layer refractive index: 1.468 Refractive index of $SiO_2 + Al_2O_3$: 1.486 Refractive index of organic substance E: 1.437 Content of organic substance: about 28 wt. % | 70 V, 70 mA Ar gas |
| 4th Layer | $Nb_2O_5$: 0.146 λ | — | $Nb_2O_5$: 0.1427 λ | — |
| 5th Layer | $SiO_2 + Al_2O_3$: 0.077 λ | — | $SiO_2 + Al_2O_3$ + organic substance E: 0.0781 λ Layer refractive index: 1.468 Refractive index of $SiO_2 + Al_2O_3$: 1.486 Refractive index of organic substance E: 1.437 Content of organic substance: about 28 wt. % | 70 V, 70 mA Ar gas |
| 6th Layer | $Nb_2O_5$: 0.131 λ | — | $Nb_2O_5$: 0.128 λ | — |
| 7th Layer | $SiO_2 + Al_2O_3$ + organic substance E: 0.276 λ Layer refractive index: 1.468 Refractive index of $SiO_2 + Al_2O_3$: 1.486 Refractive index of organic substance E: 1.437 Content of organic substance: about 28 wt. % | 70 V, 70 mA Ar gas | $SiO_2 + Al_2O_3$ + organic substance E: 0.279 λ Layer refractive index: 1.468 Refractive index of $SiO_2 + Al_2O_3$: 1.486 Refractive index of organic substance E: 1.437 Content of organic substance: about 30 wt. % | 70 V, 70 mA Ar gas |
| Organic substance used | E: E-400 (Epiol) of NOF Corporation | | E: E-400 (Epiol) made of NOF Corporation | |

TABLE 9-2

Evaluation of plastic lens performance

| | Example 17 | Example 18 |
|---|---|---|
| Luminous reflectance, Y % | 0.81% | 0.78% |
| Luminous transmittance, Z % | 99.0% | 99.02% |
| Impact resistance | CT = 2.0, FDA O, Maximum 28 g | CT = 2.0, FDA O, Maximum 36 g |
| Adhesiveness | 100/100 | 100/100 |
| Abrasion resistance | UA | UA to A |
| Heat resistance | 95° C. | 100° C. |
| Alkali resistance | UA | UA to A |

TABLE 10-1

| | Example 19 | | Example 20 | |
|---|---|---|---|---|
| | *Plastic lens substrate* | | | |
| | Diethylene glycol bisallyl carbonate | | Diethylene glycol bisallyl carbonate | |
| | *Hard Coat layer* | | | |
| | Layer A | | Layer A | |
| | *Setting for ion gun pretreatment* | | | |
| | Acceleration voltage: 200 V, Acceleration current: 100 mA | | Acceleration voltage: 200 V, Acceleration current: 100 mA | |
| | *Gas used* | | | |
| | Ar | | Ar | |
| | Film type & Film thickness | Ion gun setting | Film type & Film thickness | Ion gun setting |
| 1st Layer | $SiO_2 + Al_2O_3$ + organic substance E: 0.25 λ<br>Layer refractive index: 1.468<br>Refractive index of $SiO_2 + Al_2O_3$: 1.486<br>Refractive index of organic substance E: 1.437<br>Content of organic substance: about 28 wt. % | 70 V, 70 mA<br>Ar gas | $SiO_2 + Al_2O_3$ + organic substance E: 0.25 λ<br>Layer refractive index: 1.468<br>Refractive index of $SiO_2 + Al_2O_3$: 1.486<br>Refractive index of organic substance E: 1.437<br>Content of organic substance: about 28 wt. % | 70 V, 70 mA<br>Ar gas |
| 2nd Layer | $Nb_2O_5$: 0.0568 λ | 350 V, 130 mA<br>$O_2$/Ar, 8/2 | $Nb_2O_5$: 0.0581 λ | 350 V, 130 mA<br>$O_2$/Ar, 8/2 |
| 3rd Layer | $SiO_2 + Al_2O_3$: 0.1205 λ | — | $SiO_2 + Al_2O_3$ + organic substance E: 0.1131 λ<br>Layer refractive index: 1.468<br>Refractive index of $SiO_2 + Al_2O_3$: 1.486<br>Refractive index of organic substance E: 1.437<br>Content of organic substance: about 28 wt. % | 70 V, 70 mA<br>Ar gas |
| 4th Layer | $Nb_2O_5$: 0.1469 λ | 350 V, 130 mA<br>$O_2$/Ar, 8/2 | $Nb_2O_5$: 0.1465 λ | 350 V, 130 mA<br>$O_2$/Ar, 8/2 |
| 5th Layer | $SiO_2 + Al_2O_3$: 0.0788 λ | — | $SiO_2 + Al_2O_3$ + organic substance E, 0.0768 λ<br>Layer refractive index: 1.468<br>Refractive index of $SiO_2 + Al_2O_3$: 1.486<br>Refractive index of organic substance E: 1.437<br>Content of organic substance: about 28 wt. % | 70 V, 70 mA<br>Ar gas |
| 6th Layer | $Nb_2O_5$: 0.1210 λ | 350 V, 130 mA<br>$O_2$/Ar, 8/2 | $Nb_2O_5$: 0.125 λ | 350 V, 130 mA<br>$O_2$/Ar, 8/2 |
| 7th Layer | $SiO_2 + Al_2O_3$ + organic substance E: 0.274 λ<br>Layer refractive index: 1.468<br>Refractive index of $SiO_2 + Al_2O_3$: 1.486<br>Refractive index of organic substance E: 1.437<br>Content of organic substance: about 28 wt. % | 70 V, 70 mA<br>Ar gas | $SiO_2 + Al_2O_3$ + organic substance E: 0.279 λ<br>Layer refractive index: 1.468<br>Refractive index of $SiO_2 + Al_2O_3$: 1.486<br>Refractive index of organic substance E: 1.437<br>Content of organic substance: about 28 wt. % | 70 V, 70 mA<br>Ar gas |
| Organic substance used | E: E-400 (Epiol) made of NOF Corporation | | E: E-400 (Epiol) made of NOF Corporation | |

TABLE 10-2

Evaluation of plastic lens performance

| | Example 19 | Example 20 |
|---|---|---|
| Luminous reflectance, Y % | 0.72% | 0.70% |
| Luminous transmittance, Z % | 99.10% | 99.11% |
| Impact resistance | CT = 2.0, FDA O, Maximum 28 g | CT = 2.0, FDA O, Maximum 36 g |
| Adhesiveness | 100/100 | 100/100 |
| Abrasion resistance | UA | UA to A |
| Heat resistance | 100° C. | 110° C. |
| Alkali resistance | UA | UA to A |

TABLE 11

|  | Comparative Example 1 | | Comparative Example 2 | |
| --- | --- | --- | --- | --- |
| Plastic lens substrate | Diethylene glycol bisallyl carbonate | | Diethylene glycol bisallyl carbonate | |
| Hard coat layer | Layer A | | Layer A | |
| Ion acceleration voltage for pretreatment | No pretreatment | | No pretreatment | |
| Current |  | | | |
| Exposure time |  | | | |
| Gas used |  | | | |
|  | Film type & Film thickness | Ion gun setting | Film type & Film thickness | Ion gun setting |
| Basic layer | — | — | — | — |
| 1st Layer | $SiO_2$: 0.25λ | — | $SiO_2$: 0.25λ | — |
| 2nd Layer | $Nb_2O_5$: 0.0228λ | — | $TiO_2$: 0.0238λ | — |
| 3rd Layer | $SiO_2$: 0.1177λ | — | $SiO_2$: 0.0778λ | — |
| 4th Layer | $Nb_2O_5$: 0.0450λ | — | $TiO_2$: 0.0466λ | — |
| 5th Layer | $SiO_2$: 0.0465λ | — | $SiO_2$: 0.0489λ | — |
| 6th Layer | $Nb_2O_5$: 0.4956λ | — | $TiO_2$: 0.4991λ | — |
| 7th Layer | $SiO_2$: 0.2368λ | — | $SiO_2$: 0.2348λ | — |
| Evaluation of plastic lens performance | | | | |
| Luminous reflectance, Y % | 1.1% | | 1.2% | |
| Luminous transmittance, Z % | 98.7% | | 98.6% | |
| Impact resistance | CT = 2.0. FDA x | | CT = 2.0. FDA x | |
| Adhesiveness | 95/100 | | 95/100 | |
| Abrasion resistance | B | | B to C | |
| Heat resistance | 70° C. | | 65° C. | |
| Alkali resistance | B | | B to C | |

TABLE 12

|  | Comparative Example 3 | | Comparative Example 4 | |
| --- | --- | --- | --- | --- |
| Plastic lens substrate | Diethylene glycol bisallyl carbonate | | Diethylene glycol bisallyl carbonate | |
| Hard coat layer | Layer A | | Layer A | |
| Ion acceleration voltage for pretreatment | No pretreatment | | No pretreatment | |
| Current |  | | | |
| Exposure time |  | | | |
| Gas used |  | | | |
|  | Film type & Film thickness | Ion gun setting | Film type & Film thickness | Ion gun setting |
| Basic layer | — | — | — | — |
| 1st Layer | $SiO_2$: 0.25λ | — | $SiO_2$: 0.0209λ | — |
| 2nd Layer | $Ta_2O_5$: 0.0118λ | — | $Ta_2O_5$: 0.0527λ | — |
| 3rd Layer | $SiO_2$: 0.1816λ | — | $SiO_2$: 0.1084λ | — |
| 4th Layer | $Ta_2O_5$: 0.0891λ | — | $Ta_2O_5$: 0.1880λ | — |
| 5th Layer | $SiO_2$: 0.0405λ | — | $SiO_2$: 0.0484λ | — |
| 6th Layer | $Ta_2O_5$: 0.4077λ | — | $Ta_2O_5$: 0.1820λ | — |
| 7th Layer | $SiO_2$: 0.2425λ | — | $SiO_2$: 0.2681λ | — |
| Evaluation of plastic lens performance | | | | |
| Luminous reflectance, Y % | 1.1% | | 1.2% | |
| Luminous transmittance, Z % | 98.7% | | 98.7% | |
| Impact resistance | CT = 2.0. FDA x | | CT = 2.0 FDA x | |
| Adhesiveness | 95/100 | | 95/100 | |
| Abrasion resistance | A to B | | B | |
| Heat resistance | 70° C. | | 75° C. | |
| Alkali resistance | A to B | | B | |

As shown in Tables 1 to 10, the plastic lenses of Examples 1 to 20 had an extremely small luminous reflectance of from 0.70 to 0.82% and had a large luminance transmittance of from 99.0 to 99.11%. In addition, their impact resistance, adhesiveness, abrasion resistance, heat resistance and alkali resistance were good.

In contrast, the plastic lenses of Comparative Examples 1 to 4 all had a high luminous reflectance of from 1.1 to 1.2%, as in Tables 11 and 12. In addition, their impact resistance was low, and their adhesiveness, abrasion resistance, heat resistance and alkali resistance were lower than those in Examples 1 to 20.

While the invention has been described in connection with certain embodiments so that aspects thereof may be more fully understood and appreciated, it is not intended to limit the invention to these particular embodiments. On the contrary, it is intended to cover all alternatives, modifications and equivalents as may be included within the scope of the invention as defined by the appended claims.

What is claimed is:

1. An optical element comprising a plastic substrate, a cured film and an antireflection film, wherein the antireflection film is so configured that a first hybrid layer is nearest to the plastic substrate and another hybrid layer, which may be the same or different from the first hybrid layer, is remotest from it, and wherein each hybrid layer comprises at least one inorganic substance and at least one organic substance, wherein the cured film is between the substrate and antireflection film and is formed by curing a composition which comprises metal oxide colloid particles and an organosilicon compound of the following general formula:

$$(R_7)_a(R_8)_b Si(OR_9)_{4-(a+b)} \quad (II)$$

wherein $R_7$ and $R_8$ each independently represent an organic group selected from an alkyl group having from 1 to 8 carbon atoms, an alkenyl group having from 2 to 8 carbon atoms, an aryl group having from 6 to 8 carbon atoms, an acyl group having from 1 to 8 carbon atoms, a halogen atom, a glycidoxy group, an epoxy group, an amino group, a mercapto group, a methacryloxy group and a cyano group; $R_9$ represents an organic group selected from an alkyl group having from 1 to 8 carbon atoms, an acyl group having from 1 to 8 carbon atoms and an aryl group having from 6 to 10 carbon atoms; and a and b each independently represent an integer of 0 or 1.

2. An optical element comprising a plastic substrate and an antireflection film obtained through vapor deposition, wherein the antireflection film is so configured that a first hybrid layer is nearest to the plastic substrate and another hybrid layer, which may be the same or different from the first hybrid layer, is remotest from it, and wherein each hybrid layer comprises at least one inorganic substance and at least one organic substance that comprises a modified silicone oil.

3. The optical element according to claim 1 or 2, wherein the hybrid layer is obtained by an ion-assisted process.

4. The optical element according to claim 1 or 2, wherein the at least one inorganic substance in the hybrid layer is $SiO_2$.

5. The optical element according to claim 1 or 2, wherein the at least one inorganic substance in the hybrid layer is $SiO_2$ and $Al_2O_3$.

6. The optical element according to claim 1 or 2, wherein the at least one inorganic substance in the hybrid layer is at least one inorganic oxide selected from $Nb_2O_5$, $Ta_2O_5$, $TiO_2$, $ZrO_2$ and $Y_2O_3$.

7. The optical element according to claim 2, wherein the modified silicone oil comprises one or more compounds having a structure of any of the following general formulae (a) to (d):

(a) modified silicone oil having an organic group introduced into the side chains of polysiloxane:

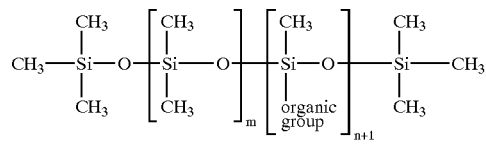

(b) modified silicone oil having an organic group introduced into both ends of polysiloxane:

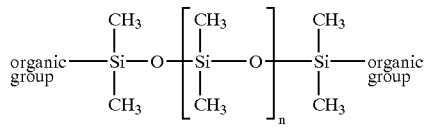

(c) modified silicone oil having an organic group introduced into one end of polysiloxane:

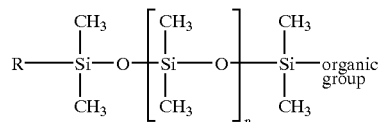

(d) modified silicone oil having an organic group introduced into the side chains and both ends of polysiloxane:

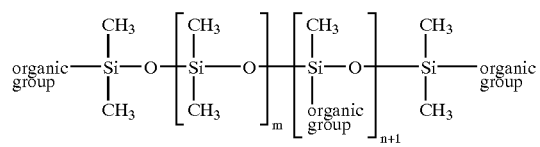

where in the general formulae (a) to (d), m and n each independently indicate an integer of 0 or more; and in the general formula (c), R represents an alkyl group having from 1 to 10 carbon atoms, an alkenyl group having from 2 to 10 carbon atoms, or an alkynyl group having from 2 to 10 carbon atoms.

8. The optical element according to claim 7, wherein the organic group is selected from an amino group, an epoxy group, a carboxyl group, a hydroxyl group, a hydroxyl group-containing hydrocarbon group having 1 to 15 carbon atoms, a methacrylic group, a mercapto group, a phenol group, an alkoxy group having from 1 to 15 carbon atoms, a hydrocarbon group having 1 to 15 carbon atoms carrying one or more of the substituents listed above, and combinations thereof.

9. The optical element according to claim 7, wherein the organic group is selected from an alkyl group having from 1 to 15 carbon atoms, an ester group having from 2 to 15 carbon atoms, a methylstyryl group, a poly($C_{2-15}$ alkylene) ether group, having 2 to 15 repeating units, an ester of a saturated or unsaturated fatty acid having 16 to 20 carbon atoms, and a hydrocarbon group having 1 to 15 carbon atoms that is substituted with one or more fluorine atoms.

10. The optical element according to any one of claim 2 or 7–9, wherein the modified silicone oil has a number-average molecular weight of from 250 to 6,000.

11. An optical element comprising a plastic substrate and an antireflection film obtained through vapor deposition, wherein the antireflection film is so configured that a first hybrid layer is nearest to the plastic substrate and another hybrid layer, which may be the same or different from the first hybrid layer, is remotest from it, and wherein each hybrid layer comprises at least one inorganic substance and at least one organic substance that comprises a compound of the following general formula (I):

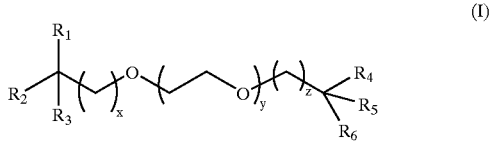

wherein x and z each independently indicate an integer of 0 or more; y indicates an integer of 1 or more; $R_1$ to $R_6$ each independently represent a hydrogen atom or an organic group selected from a methyl group, a hydrocarbon group having 1 to 15 carbon atoms containing an epoxy group, an amino group, a (meth)acrylic group, a hydroxyl group, a hydrocarbon group having 1 to 15 carbon atoms containing a carbonyl group, a vinyl group, a thiol group, a carbon-carbon triple bond-containing hydrocarbon group having 1 to 15 carbon atoms, an alkoxysilane group having from 1 to 15 carbon atoms, an alkylamino group having from 1 to 15 carbon atoms and a cyclic alkyl group having from 5 to 8 carbon atoms.

12. The optical element according to claim 11, wherein at least one of $R_1$ to $R_6$ is a sorbitan residue or a sorbitan ester residue.

13. The optical element according to claim 11, wherein the compound of the general formula (I) is polyethylene glycol monobutyl monoglycidyl ether, polyethylene glycol diglycidyl ether, polyoxyethylene α,ω-bis-3-aminopropyl ether, polyethylene glycol sorbitan monolaurate, polyethylene glycol sorbitan monooleate or polyoxyethylene monoacrylate.

14. The optical element having an antireflection film according to any one of claims 11–13, wherein the compound of the general formula (I) has a number-average molecular weight of from 250 to 6,000.

15. The optical element having an antireflection film according to any one of claims 1, 2 or 11, wherein the content of the at least one organic substance in the hybrid layer in the film is from 0.02% by weight to 70% by weight of the hybrid layer.

16. The optical element according to any one of claims 1, 2 or 11, which further includes a basic layer having a thickness of from 1 to 5 nm and comprising at least one metal selected from nickel (Ni), silver (Ag), platinum (Pt), niobium (Nb) and titanium (Ti), formed between the plastic substrate and the antireflection film.

17. The optical element according to any one of claims 1, 2 or 11, wherein the antireflection film comprises the following layers formed in that order on the plastic substrate:
  1st layer: hybrid layer of $SiO_2+Al_2O_3$+organic substance (layer thickness, 10 to 180 nm),
  2nd layer: $Nb_2O_5$ layer (layer thickness, 1 to 25 nm),
  3rd layer: $SiO_2+Al_2O_3$ layer (layer thickness, 10 to 50 nm),
  4th layer: $Nb_2O_5$ layer (layer thickness, 10 to 55 nm),
  5th layer: $SiO_2+Al_2O_3$ layer (layer thickness, 10 to 50 nm),
  6th layer: $Nb_2O_5$ layer (layer thickness, 10 to 120 nm), and
  7th layer: hybrid layer of $SiO_2+Al_2O_3$+organic substance (layer thickness, 70 to 100 nm).

18. The optical element according to claim 11, wherein the hybrid layer is obtainable by an ion-assisted process.

19. The optical element according to claim 17, wherein at least one of the hybrid layers is obtainable by an ion-assisted process.

20. A process of making an optical element comprising vapor depositing an antireflection film on a plastic substrate, wherein the antireflection film is so configured that a first hybrid layer is nearest to the plastic substrate and another hybrid layer, which may be the same or different from the first hybrid layer, is remotest from it, and wherein each hybrid layer comprises at least one inorganic substance and at least one organic substance that comprises a modified silicone oil.

21. The process of claim 20 wherein the vapor deposition takes place in the presence of an ionized gas.

22. The process of claim 20 wherein the at least one inorganic substance is at least one inorganic oxide selected from $SiO_2$, $Al_2O_3$, $Nb_2O_5$, $Ta_2O_5$, $TiO_2$, $ZrO_2$ and $Y_2O_3$.

23. The process of any one of claims 20–22 wherein the modified silicone oil comprises one or more compounds having a structure of any of the following general formulae (a) to (d):

(a) modified silicone oil having an organic group introduced into the side chains of polysiloxane:

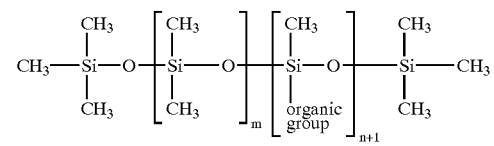

(b) modified silicone oil having an organic group introduced into both ends of polysiloxane:

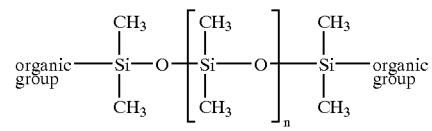

(c) modified silicone oil having an organic group introduced into one end of polysiloxane:

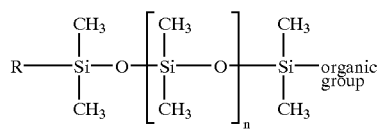

(d) modified silicone oil having an organic group introduced into the side chains and both ends of polysiloxane:

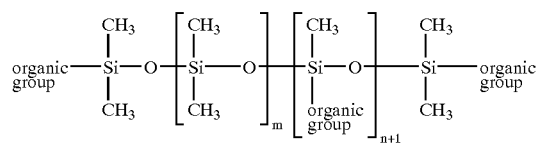

where in the general formulae (a) to (d), m and n each independently indicate an integer of 0 or more; and in the general formula (c), R represents an alkyl group having from 1 to 10 carbon atoms, an alkenyl group having from 2 to 10 carbon atoms, or an alkynyl group having from 2 to 10 carbon atoms.

24. The process of claim 23, wherein the organic group is selected from an amino group, an epoxy group, a carboxyl group, a hydroxyl group, a hydroxyl group-containing hydrocarbon group having 1 to 15 carbon atoms, a methacrylic group, a mercapto group, a phenol group, an alkoxy group having from 1 to 15 carbon atoms, a hydrocarbon group having 1 to 15 carbon atoms carrying one or more of the substituents listed above, and combinations thereof.

25. The process of claim 23, wherein the organic group is selected from an alkyl group having from 1 to 15 carbon atoms, an ester group having from 2 to 15 carbon atoms, a methylstyryl group, a poly($C_{2-15}$ alkylene)ether group, having 2 to 15 repeating units, an ester of a saturated or unsaturated fatty acid having 16 to 20 carbon atoms, and a hydrocarbon group having 1 to 15 carbon atoms that is substituted with one or more fluorine atoms.

26. The process of claim 23, wherein the modified silicone oil has a number-average molecular weight of from 250 to 6,000.

27. A process of making an optical element comprising vapor depositing an antireflection film on a plastic substrate, wherein the antireflection film is so configured that a first hybrid layer is nearest to the plastic substrate and another hybrid layer, which may be the same or different from the first hybrid layer, is remotest from it, wherein each hybrid layer comprises at least one inorganic substance and at least one organic substance that comprises a compound of the following general formula (I):

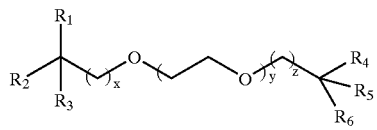
(I)

wherein x and z each independently indicate an integer of 0 or more; y indicates an integer of 1 or more; $R_1$ to $R_6$ each independently represent a hydrogen atom or an organic group selected from a methyl group, a hydrocarbon group having 1 to 15 carbon atoms containing an epoxy group, an amino group, a (meth)acrylic group, a hydroxyl group, a hydrocarbon group having 1 to 15 carbon atoms containing a carbonyl group, a vinyl group, a thiol group, a carbon-carbon triple bond-containing hydrocarbon group having 1 to 15 carbon atoms, an alkoxysilane group having from 1 to 15 carbon atoms, an alkylamino group having from 1 to 15 carbon atoms and a cyclic alkyl group having from 5 to 8 carbon atoms.

28. The process of claim 27 wherein at least one of $R_1$ to $R_6$ is a sorbitan residue or a sorbitan ester residue.

29. The process of claim 27 wherein the compound of the general formula (I) is polyethylene glycol monobutyl monoglycidyl ether, polyethylene glycol diglycidyl ether, polyoxyethylene α,ω-bis-3-aminopropyl ether, polyethylene glycol sorbitan monolaurate, polyethylene glycol sorbitan monooleate or polyoxyethylene monoacrylate.

30. The process of any one of claims 27–29 wherein the compound of the general formula (I) has a number-average molecular weight of from 250 to 6,000.

31. An optical element comprising a plastic substrate, a cured film and an antireflection film, wherein at least one layer of the antireflection film is a hybrid layer comprising at least one inorganic substance and at least one organic substance, wherein the cured film is between the substrate and antireflection film and is formed by curing a composition which comprises metal oxide colloid particles and an organosilicon compound of the following general formula:

$(R_7)_a(R_8)_b Si(OR_9)_{4-(a+b)}$ (II)

wherein $R_7$ and $R_8$ each independently represent an organic group selected from an alkyl group having from 1 to 8 carbon atoms, an alkenyl group having from 2 to 8 carbon atoms, an aryl group having from 6 to 8 carbon atoms, an acyl group having from 1 to 8 carbon atoms, a halogen atom, a glycidoxy group, an epoxy group, an amino group, a mercapto group, a methacryloxy group and a cyano group; R9 represents an organic group selected from an alkyl group having from 1 to 8 carbon atoms, an acyl group having from 1 to 8 carbon atoms and an aryl group having from 6 to 10 carbon atoms; and a and b each independently represent an integer of 0 or 1, and wherein the at least one inorganic substance in the hybrid layer is at least one inorganic oxide selected from $Nb_2O_5$, $Ta_2O_5$, $TiO_2$, $ZrO_2$ and $Y_2O_3$.

32. An optical element comprising a plastic substrate and an antireflection film obtained through vapor deposition, wherein at least one layer of the antireflection film is a hybrid layer comprising at least one inorganic substance and at least one organic substance that comprises a modified silicone oil, and wherein the at least one inorganic substance in the hybrid layer is at least one inorganic oxide selected from $Nb_2O_5$, $Ta_2O_5$, $TiO_2$, $ZrO_2$ and $Y_2O_3$.

33. An optical element comprising a plastic substrate and an antireflection film obtained through vapor deposition, wherein at least one layer of the antireflection film is a hybrid layer comprising at least one inorganic substance and at least one organic substance that comprises a modified silicone oil, and wherein the modified silicone oil comprises one or more compounds having a structure of any of the following general formulae (a) to (d):

(a) modified silicone oil having an organic group introduced into the side chains of polysiloxane:

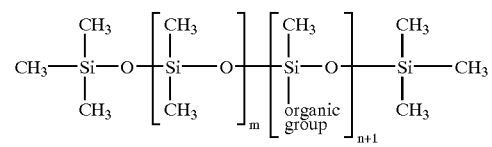

(b) modified silicone oil having an organic group introduced into both ends of polysiloxane:

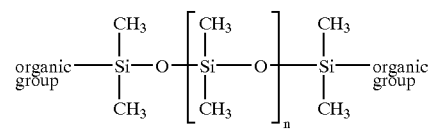

(c) modified silicone oil having an organic group introduced into one end of polysiloxane:

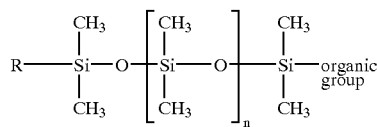

(d) modified silicone oil having an organic group introduced into the side chains and both ends of polysiloxane:

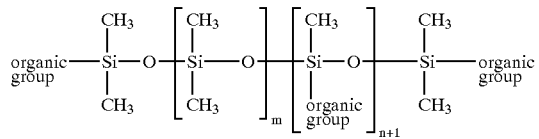

where in the general formulae (a) to (d), m and n each independently indicate an integer of 0 or more; and in the general formula (c), R represents an alkyl group having from 1 to 10 carbon atoms, an alkenyl group having from 2 to 10 carbon atoms, or an alkynyl group having from 2 to 10 carbon atoms.

34. The optical element according to claim 33, wherein the organic group is selected from an amino group, an epoxy group, a carboxyl group, a hydroxyl group, a hydroxyl group-containing hydrocarbon group having 1 to 15 carbon atoms, a methacrylic group, a mercapto group, a phenol group, an alkoxy group having from 1 to 15 carbon atoms, a hydrocarbon group having 1 to 15 carbon atoms carrying one or more of the substituents listed above, and combinations thereof.

35. The optical element according to claim 33, wherein the organic group is selected from an alkyl group having from 1 to 15 carbon atoms, an ester group having from 2 to 15 carbon atoms, a methylstyryl group, a poly($C_{2-15}$ alkylene)ether group, having 2 to 15 repeating units, an ester of a saturated or unsaturated fatty acid having 16 to 20 carbon atoms, and a hydrocarbon group having 1 to 15 carbon atoms that is substituted with one or more fluorine atoms.

36. The optical element according to any one of claims 33, 34 or 35, wherein the modified silicone oil has a number-average molecular weight of from 250 to 6,000.

37. An optical element comprising a plastic substrate and an antireflection film obtained through vapor deposition, wherein at least one layer of the antireflection film is a hybrid layer comprising at least one inorganic substance and at least one organic substance that comprises a compound of the following general formula (I):

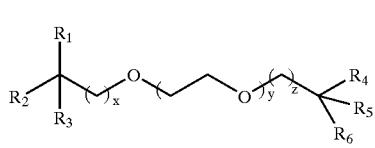

wherein x and z each independently indicate an integer of 0 or more; y indicates an integer of 1 or more; $R_1$ to $R_6$ each independently represent a hydrogen atom or an organic group selected from a methyl group, a hydrocarbon group having 1 to 15 carbon atoms containing an epoxy group, an amino group, a (meth)acrylic group, a hydroxyl group, a hydrocarbon group having 1 to 15 carbon atoms containing a carbonyl group, a vinyl group, a thiol group, a carbon-carbon triple bond-containing hydrocarbon group having 1 to 15 carbon atoms, an alkoxysilane group having from 1 to 15 carbon atoms, an alkylamino group having from 1 to 15 carbon atoms and a cyclic alkyl group having from 5 to 8 carbon atoms, and wherein at least one of $R_1$ to $R_6$ is a sorbitan residue or a sorbitan ester residue.

38. An optical element comprising a plastic substrate and an antireflection film obtained through vapor deposition, wherein at least one layer of the antireflection film is a hybrid layer comprising at least one inorganic substance and at least one organic substance that comprises a compound selected from the group of polyethylene glycol monobutyl monoglycidyl ether, polyethylene glycol diglycidyl ether, polyoxyethylene α,ω-bis-3-aminopropyl ether, polyethylene glycol sorbitan monolaurate, polyethylene glycol sorbitan monooleate and polyoxyethylene monoacrylate.

39. The optical element having an antireflection film according to claim 37 or 38, wherein the compound has a number-average molecular weight of from 250 to 6,000.

* * * * *